US012666277B2

(12) United States Patent
Micheli et al.

(10) Patent No.: US 12,666,277 B2
(45) Date of Patent: Jun. 23, 2026

(54) METHOD AND SYSTEM FOR GENERATING REFERENCE DATA ASSOCIATED TO WEATHER CONDITIONS, METHOD AND SYSTEM FOR DETERMINING WEATHER CONDITIONS, AND METHOD AND SYSTEM FOR CONTROLLING A RADIO ACCESS NETWORK

(71) Applicant: Telecom Italia S.p.A., Milan (IT)

(72) Inventors: Davide Micheli, Rome (IT); Aldo Vannelli, Rome (IT)

(73) Assignee: TELECOM ITALIA S.P.A., Milan (IT)

( * ) Notice: Subject to any disclaimer, the term of this patent is extended or adjusted under 35 U.S.C. 154(b) by 316 days.

(21) Appl. No.: 18/290,331

(22) PCT Filed: May 6, 2022

(86) PCT No.: PCT/IB2022/054204
§ 371 (c)(1),
(2) Date: Nov. 13, 2023

(87) PCT Pub. No.: WO2022/238835
PCT Pub. Date: Nov. 17, 2022

(65) Prior Publication Data
US 2024/0251255 A1 Jul. 25, 2024

(30) Foreign Application Priority Data

May 14, 2021 (IT) ......................... 102021000012512

(51) Int. Cl.
*H04W 24/02* (2009.01)
*G01W 1/06* (2006.01)
*H04W 4/021* (2018.01)
(52) U.S. Cl.
CPC .............. *H04W 24/02* (2013.01); *G01W 1/06* (2013.01); *H04W 4/021* (2013.01)

(58) Field of Classification Search
CPC ..... H04W 24/02; H04W 4/021; H04W 24/04; H04W 24/10; G01W 1/06; G06N 20/00; Y02A 90/10
See application file for complete search history.

(56) References Cited

U.S. PATENT DOCUMENTS 10,893,424 B1 1/2021 Malboubi et al.
11,133,987 B2 * 9/2021 Patel ....................... H04L 41/16
(Continued)

FOREIGN PATENT DOCUMENTS

WO 2021/016078 A1 1/2021

OTHER PUBLICATIONS

International Search Report and Written Opinion mailed on Jun. 28, 2022, received for PCT Application PCT/IB2022/054204, filed on May 6, 2022, 9 pages.

*Primary Examiner* — Santiago Garcia
(74) *Attorney, Agent, or Firm* — XSENSUS LLP

(57) ABSTRACT

Generating reference data associated to weather conditions by determining a geographical area of interest; receiving, from wireless devices wirelessly connected to a Radio Access Network (RAN) measurement parameters representative of measurements of radio quality of the wireless connection between said wireless devices and the RAN, wherein said wireless devices are located in said area of interest, said measurement parameters being associated with respective time references; for each time reference or set of time references, determining reference data, associated to said time reference or set of time references, by performing an analysis of said measurement parameters; receiving a weather signal, representative of objective weather conditions in said area of interest at a time corresponding to said time reference of said set of time references; storing said reference data in association with the respective objective (Continued)

1000 — Start

1010 — Defining geographical area of interest

1020 — Dividing geographical area of interest into pixels based on density of devices 1030 — Arranging datasets for AI system training 1040 — Training AI system based on training datasets and meteo detection 1050 — Receiving data from devices and determining weather conditions by AI system weather conditions associated to the same time reference or set of time references.

17 Claims, 8 Drawing Sheets

(56)                    References Cited

U.S. PATENT DOCUMENTS

| | | | | |
|---|---|---|---|---|
| 2019/0319852 | A1* | 10/2019 | Casey | G06N 20/00 |
| 2019/0379468 | A1* | 12/2019 | Roessel | H04B 17/309 |
| 2020/0322814 | A1* | 10/2020 | Tofighbakhsh | H04W 24/02 |
| 2020/0344641 | A1* | 10/2020 | Veggalam | H04W 76/27 |
| 2021/0241090 | A1* | 8/2021 | Chen | G06N 3/092 |
| 2021/0297878 | A1* | 9/2021 | Mondragon | G06N 3/0442 |
| 2022/0272043 | A1* | 8/2022 | Mishra | G06N 20/00 |
| 2022/0292000 | A1* | 9/2022 | Xu | G06F 11/3006 |
| 2022/0295309 | A1* | 9/2022 | Akhtar | H04W 24/02 |
| 2022/0303787 | A1* | 9/2022 | Pratt | H04W 64/00 |
| 2022/0371731 | A1* | 11/2022 | Tamura | G08G 5/54 |
| 2024/0372777 | A1* | 11/2024 | Mada | H04L 41/0897 |

* cited by examiner

Connection with RBS of Serving Cell
Connection with RBS Adjacent Cells
Connection with GNSS (a)          (b)          (c)

□ dry
▨ wet

1000 — Start

1010 — Defining geographical area of interest

1020 — Dividing geographical area of interest into pixels based on density of devices 1030 — Arranging datasets for AI system training 1040 — Training AI system based on training datasets and meteo detection 1050 — Receiving data from devices and determining weather conditions by AI system

METHOD AND SYSTEM FOR GENERATING REFERENCE DATA ASSOCIATED TO WEATHER CONDITIONS, METHOD AND SYSTEM FOR DETERMINING WEATHER CONDITIONS, AND METHOD AND SYSTEM FOR CONTROLLING A RADIO ACCESS NETWORK

CROSS-REFERENCE TO RELATED APPLICATIONS

The present application is based on PCT filing PCT/IB2022/054204, filed May 6, 2022, which claims priority from Italian Patent Application No. 102021000012512, filed May 14, 2021, the entire contents of each are incorporated herein by reference.

BACKGROUND OF THE INVENTION

Field of the Invention

The present invention refers to a method for generating reference data associated to weather conditions.

The present invention also refers to a system for generating reference data associated to weather conditions.

The present invention also refers to a method for determining weather conditions.

The present invention also refers to a system for determining weather conditions.

In addition to the above, the invention refers to a method and a system for controlling a radio access network.

Description of the Related Art

As known, several methods can be used in order to determine and foresee weather conditions in a determined geographical area.

Some of them take electromagnetic propagation into account, simply associating a reduction of received power (with respect to "standard" conditions) with a rainy weather.

F. Beritelli et al. "Rainfall Estimation Based on the Intensity of the Received Signal in a LTE/4G Mobile Terminal by Using a Probabilistic Neural Network," IEEE Access, VOLUME 6, 2018. DOI 10.1109/ACCESS.2018.2839699 discloses a methodology for rainfall estimation based on the impact of rain on electromagnetic waves. In particular, a classification method is disclosed which is based on a probabilistic neural network to obtain a classification between four rainfall intensities: no rain, weak rain, moderate rain, and heavy rain. The rainfall classification method is based on three received signal level (RSL) local features of the 4G/LTE: the instantaneous RSL, the average RSL value, and its variance calculated by using a sliding window.

Umair Ahmed Korai, Lorenzo Luini, Roberto Nebuloni, Model for the Prediction of Rain Attenuation Affecting Free Space Optical Links. Electronics 2018, 7, 407; doi: 10.3390/electronics7120407 www.mdpi.com/journal/electronics, discloses a model for the prediction of the attenuation induced by rain on free space optical (FSO) links. The methodology starts from a simulation of the interaction between FSO links (path length up to 5 km) and precipitation maps, from which analytical expressions are then derived. The model receives the local rainfall statistics for the site of interest; it takes into account the dependence of the attenuation on the drop size distribution (DSD), as well as multiple scattering effects associated with rain, which contributes to reducing the overall predicted attenuation.

Li, Y. and P. Yang, "The permittivity based on electromagnetic wave attenuation for rain medium and its applications," J. of Electromagnetic Waves and Appl., Vol. 20, No. 15, 2231-2238, 2006 discloses utilization of a system identification method to investigate the electromagnetic wave attenuation induced by rain, exploiting the analytical expression of equivalent permittivity for rain medium.

The Applicant has noted that propagation phenomena (e.g. between base stations and mobile devices) are more complex than this, and can be leveraged to obtain weather information that is more detailed and reliable.

For example, a wet pavement (which is wet because of rain) can increase reflection of an electromagnetic field and, as a consequence, provide a positive contribution to the received power; by contrast, wet trees typically absorb electromagnetic wave thereby reducing the power measured at the receiving end. A glass surface in wet condition shows an increased reflection with respect to a dry condition; however, the same glass surface in wet condition shows an increased attenuation of the transmitted electromagnetic field with respect to a condition in which the same surface is dry. Accordingly, it does not appear correct to simply associate a reduction of the received power with rain and vice versa.

Furthermore, the Applicant observes that a radio channel is formed by multiple paths (usually referred to as "multipath"); each path is different from the others, travels a different distance and is reflected/transmitted by different surfaces/materials. Accordingly, each path is subject to a different attenuation with respect to the others. Moreover, the propagation conditions of each path can vary, since mobile devices typically change their position over time, and the surrounding environmental conditions can also vary.

In addition to the above, the Applicant has noted that most prior art techniques try to correlate weather conditions to propagation conditions of electromagnetic waves having very high frequency (e.g. point-to-point links at ~10 GHZ). At these frequencies, attenuation appears to be the prominent phenomenon; as a consequence, a mere analysis of power loss can be sufficient in order to determine at least certain weather conditions. In this context, the Applicant has observed that, if lower frequencies are considered (e.g. 1-3 GHZ, commonly used for mobile communications), attenuation caused by raindrops is at least comparable with (sometimes even less influential than) other physical phenomena occurring in the propagation environment.

The Applicant has realized that all these factors/phenomena do not influence only the power received at the measuring end, but also other parameters such as, for example, radio quality and time distance between the mobile station and the serving base station.

SUMMARY OF THE INVENTION

In view of the above, the Applicant has perceived that a more accurate analysis of the measurement data made available by devices that are wirelessly connected to a radio access network can bring to a more precise and reliable determination of weather conditions in a determined geographical area.

A first aspect of the present invention refers to a method for generating reference data associated to weather conditions.

In an embodiment of the present invention, the method for generating reference data associated to weather conditions comprises determining a geographical area of interest.

In an embodiment of the present invention, the method for generating reference data associated to weather conditions comprises receiving first measurement parameters.

In an embodiment of the present invention, said first measurement parameters are received from first wireless devices wirelessly connected to a Radio Access Network, RAN.

In an embodiment of the present invention, said first measurement parameters are representative of measurements of radio quality of the wireless connection between said first wireless devices and the RAN.

In an embodiment of the present invention, said first wireless devices are located in said area of interest.

In an embodiment of the present invention, said first measurement parameters are associated with respective first time references.

In an embodiment of the present invention, the method for generating reference data associated to weather conditions comprises, for each first time reference or set of first time references, determining reference data.

In an embodiment of the present invention, said reference data are associated to said first time reference or set of first time references.

In an embodiment of the present invention, said reference data are determined by performing an analysis of said first measurement parameters.

In an embodiment of the present invention, the method for generating reference data associated to weather conditions comprises receiving a weather signal.

In an embodiment of the present invention, said weather signal is representative of objective weather conditions in said area of interest at a time corresponding to said first time reference of said set of first time references.

In an embodiment of the present invention, the method for generating reference data associated to weather conditions comprises storing said reference data in association with the respective objective weather conditions associated to the same time reference or set of time references.

In an embodiment of the present invention, said first measurement parameters are included in Minimization of Drive Tests, MDT, signals transmitted by said first wireless devices.

In an embodiment of the present invention, determining said reference data comprises providing an Artificial Intelligence, AI, system.

In an embodiment of the present invention, determining said reference data comprises training said AI system to associate different radio quality measurements to different weather conditions.

In an embodiment of the present invention, training said AI system comprises defining two or more labels, each associated to respective different weather conditions.

In an embodiment of the present invention, training said AI system comprises providing in input to said AI system training datasets, comprising said first measurement parameters associated with respective geographical positions and time references.

In an embodiment of the present invention, training said AI system comprises providing in input to said AI system training labels associated with said geographical positions and time references.

In an embodiment of the present invention, the method for generating reference data associated to weather conditions comprises dividing said area of interest into a plurality of pixels.

In an embodiment of the present invention, said area of interest is divided into pixels based on the distribution of said wireless devices in the area of interest.

In an embodiment of the present invention, determining said reference data comprises determining a subset of reference data for each of said pixels.

In an embodiment of the present invention, the method for generating reference data associated to weather conditions comprises defining two or more labels, each representative of respective weather conditions.

In an embodiment of the present invention, associating said reference data with the respective objective weather conditions comprises selecting at least one label as a function of said respective objective weather conditions.

In an embodiment of the present invention, associating said reference data with the respective objective weather conditions comprises associating said reference data with the selected label.

In an embodiment of the present invention, determining a subset of reference data for each pixel comprises, for each pixel, selecting at least one label based on the objective weather conditions of said pixel.

In an embodiment of the present invention, determining a subset of reference data for each pixel comprises, for each pixel, associating the subset of reference data associated to said pixel with the selected label.

In an embodiment of the present invention, the method for method for generating reference data associated to weather conditions comprises receiving, from each first wireless device, an information signal, including at least said first measurement parameters.

In an embodiment of the present invention, the method for method for generating reference data associated to weather conditions comprises determining a position of each of said first wireless devices, based on the respective information signal.

In an embodiment of the present invention, if said information signal also comprises data representative of a geographical position of said first wireless device, determining the position of said first wireless device comprises reading said geographical position from said information signal.

In an embodiment of the present invention, if said information signal does not comprise data representative of a geographical position of said first wireless device and comprises an identifier associated to the first wireless device, determining the position of said first wireless device comprises retrieving, from a pre-arranged memory area, a geographical position of said first wireless device associated to said identifier.

A second aspect of the present invention refers to a method for determining weather conditions.

In an embodiment of the present invention, the method for determining weather conditions comprises performing said method for generating reference data associated to weather conditions.

In an embodiment of the present invention, the method for determining weather conditions comprises receiving second measurement parameters.

In an embodiment of the present invention, said second measurement parameters are received from a plurality of second wireless devices wirelessly connected to said RAN.

In an embodiment of the present invention, said second measurement parameters are representative of measurements of radio quality of the wireless connection between said second wireless devices and the RAN.

In an embodiment of the present invention, said second wireless devices are located in said area of interest.

In an embodiment of the present invention, said second measurement parameters are associated with respective second time references.

In an embodiment of the present invention, the method for determining weather conditions comprises comparing the second measurement parameters with the reference data.

In an embodiment of the present invention, the method for determining weather conditions comprises determining weather conditions, associated with said second time references, of said area of interest, based on said comparison.

In an embodiment of the present invention, said second measurement parameters are included in Minimization of Drive Tests, MDT, signals transmitted by said second wireless devices.

In an embodiment of the present invention, the method for determining weather conditions comprises dividing said area of interest into a plurality of pixels.

In an embodiment of the present invention, the area of interest is divided into pixels based on the distribution of said wireless devices in the area of interest.

In an embodiment of the present invention, determining said reference data comprises determining a subset of reference data for each of said pixels.

In an embodiment of the present invention, determining weather conditions of said area of interest comprises determining weather conditions of each of said pixels.

In an embodiment of the present invention, the method for determining weather conditions comprises defining two or more labels, each representative of respective weather conditions.

In an embodiment of the present invention, associating said reference data with the respective objective weather conditions comprises selecting at least one label as a function of said respective objective weather conditions.

In an embodiment of the present invention, associating said reference data with the respective objective weather conditions comprises associating said reference data with the selected label.

In an embodiment of the present invention, determining weather conditions of said area of interest comprises selecting at least one label based on the comparison between the second measurement parameters and the reference data.

In an embodiment of the present invention, determining weather conditions of said area of interest comprises associating the selected label to the area of interest.

In an embodiment of the present invention, determining a subset of reference data for each pixel comprises, for each pixel, selecting at least one label based on the objective weather conditions of said pixel.

In an embodiment of the present invention, determining a subset of reference data for each pixel comprises, for each pixel, associating the subset of reference data associated to said pixel with the selected label.

In an embodiment of the present invention, determining weather conditions of each pixel comprises, for each pixel, selecting at least one label based on the comparison between the second measurement parameters and the reference data.

In an embodiment of the present invention, determining weather conditions of each pixel comprises, for each pixel, associating the selected label to the respective pixel.

In an embodiment of the present invention, the method for determining weather conditions comprises receiving, from each first and/or second wireless device, an information signal, including at least said first and/or second measurement parameters.

In an embodiment of the present invention, the method for determining weather conditions comprises determining a position of each of said first and/or second wireless devices, based on the respective information signal.

In an embodiment of the present invention, if said information signal also comprises data representative of a geographical position of said first and/or wireless device, determining the position of said first and/or second wireless device comprises reading said geographical position from said information signal.

In an embodiment of the present invention, if said information signal does not comprise data representative of a geographical position of said first and/or second wireless device and comprises an identifier associated to the same first and/or second wireless device, determining the position of said first and/or second wireless device comprises retrieving, from a pre-arranged memory area, a geographical position of said first and/or second wireless device associated to said identifier.

In an embodiment of the present invention, said information signal is a Minimization of Drive Tests, MDT, signal.

In an embodiment of the present invention, determining said weather conditions comprises providing said second measurement parameters as input to the AI system.

In an embodiment of the present invention, determining said weather conditions comprises determining, by said AI system, the weather conditions to be determined based on said second measurement parameters.

A third aspect of the present invention refers to a method for controlling a radio access network, RAN.

In an embodiment of the present invention, the method for controlling said RAN comprises carrying out said method for determining weather conditions.

In an embodiment of the present invention, the method for controlling said RAN comprises determining modifications to be applied to said RAN based on said weather conditions.

In an embodiment of the present invention, the method for controlling said RAN comprises applying said modifications.

In an embodiment of the present invention, a Self-Organizing Network, SON, is associated to said RAN.

In an embodiment of the present invention, said SON comprises a managing unit configured to automatically apply said modifications based on the weather conditions.

In an embodiment of the present invention, the modifications to said RAN include modifications to a radiation pattern of one or more antennas of said RAN.

A fourth aspect of the present invention refers to a system for generating reference data associated to weather conditions.

In an embodiment of the present invention, the system for generating reference data associated to weather conditions, comprises a first memory.

In an embodiment of the present invention, the system for generating reference data associated to weather conditions, comprises a first processing unit.

In an embodiment of the present invention, the first processing unit is coupled to said first memory.

In an embodiment of the present invention, the first processing unit is configured for receiving first measurement parameters.

In an embodiment of the present invention, said first measurement parameters are received from first wireless devices wirelessly connected to a Radio Access Network, RAN.

In an embodiment of the present invention, said first measurement parameters are representative of measurements of radio quality of the wireless connection between the first wireless devices and the RAN.

In an embodiment of the present invention, said first wireless devices are located in said area of interest.

In an embodiment of the present invention, said first measurement parameters are associated with respective first time references.

In an embodiment of the present invention, the first processing unit is configured for, for each first time reference or set of first time references, determining reference data.

In an embodiment of the present invention, said reference data are associated to said first time reference or set of first time references.

In an embodiment of the present invention, said first processing unit determines said reference data by performing an analysis of said first measurement parameters.

In an embodiment of the present invention, said first processing unit is configured for receiving a weather signal, representative of objective weather conditions in said area of interest at a time corresponding to said first time reference of said set of first time references.

In an embodiment of the present invention, said first processing unit is configured for storing, in said first memory, said reference data in association with the respective objective weather conditions associated to the same time reference or set of time references.

A fifth aspect of the present invention refers to a system for determining weather conditions.

In an embodiment of the present invention, the system for determining weather conditions comprises said system for generating reference data associated to weather conditions.

In an embodiment of the present invention, the system for determining weather conditions comprises a second memory, wherein said reference data are stored.

In an embodiment of the present invention, the system for determining weather conditions comprises a second processing unit.

In an embodiment of the present invention, said second processing unit is coupled to said second memory.

In an embodiment of the present invention, said second processing unit is configured for receiving second measurement parameters.

In an embodiment of the present invention, said second measurement parameters are received from a plurality of second wireless devices.

In an embodiment of the present invention, said second wireless devices are located in said geographical area of interest.

In an embodiment of the present invention, said second wireless devices are wirelessly connected with said RAN.

In an embodiment of the present invention, said second measurement parameters are representative of radio quality of wireless connection between said second wireless devices and said RAN.

In an embodiment of the present invention, said second measurement parameters are associates with respective second time references.

In an embodiment of the present invention, said second processing unit is configured for comparing the second measurement parameters with the reference data.

In an embodiment of the present invention, said second processing unit is configured for determining weather conditions, associated with said second time references, of said area of interest, based on said comparison.

In an embodiment of the present invention, said second processing unit is configured for generating a notification signal representative of the thus determined weather conditions.

A sixth aspect of the present invention refers to a system for controlling a Radio Access Network, RAN.

In an embodiment of the present invention, said system for controlling said RAN comprises said system for determining weather conditions.

In an embodiment of the present invention, said system for controlling said RAN comprises a managing unit.

In an embodiment of the present invention, said managing unit is configured to receive from said second processing unit the notification signal.

In an embodiment of the present invention, said managing unit is configured to determine modifications to be applied to said RAN based on said notification signal.

In an embodiment of the present invention, said managing unit is configured to send command signals to a control unit associated to said RAN for causing said modifications to be applied.

BRIEF DESCRIPTION OF THE DRAWINGS

Further features and advantages will appear more clearly from the detailed description of preferred and non-exclusive embodiments of the invention. This description is provided hereinafter with reference to the accompanying illustrative and non-limiting figures, in which.

DESCRIPTION OF EMBODIMENTS OF THE PRESENT INVENTION

Figure 1:
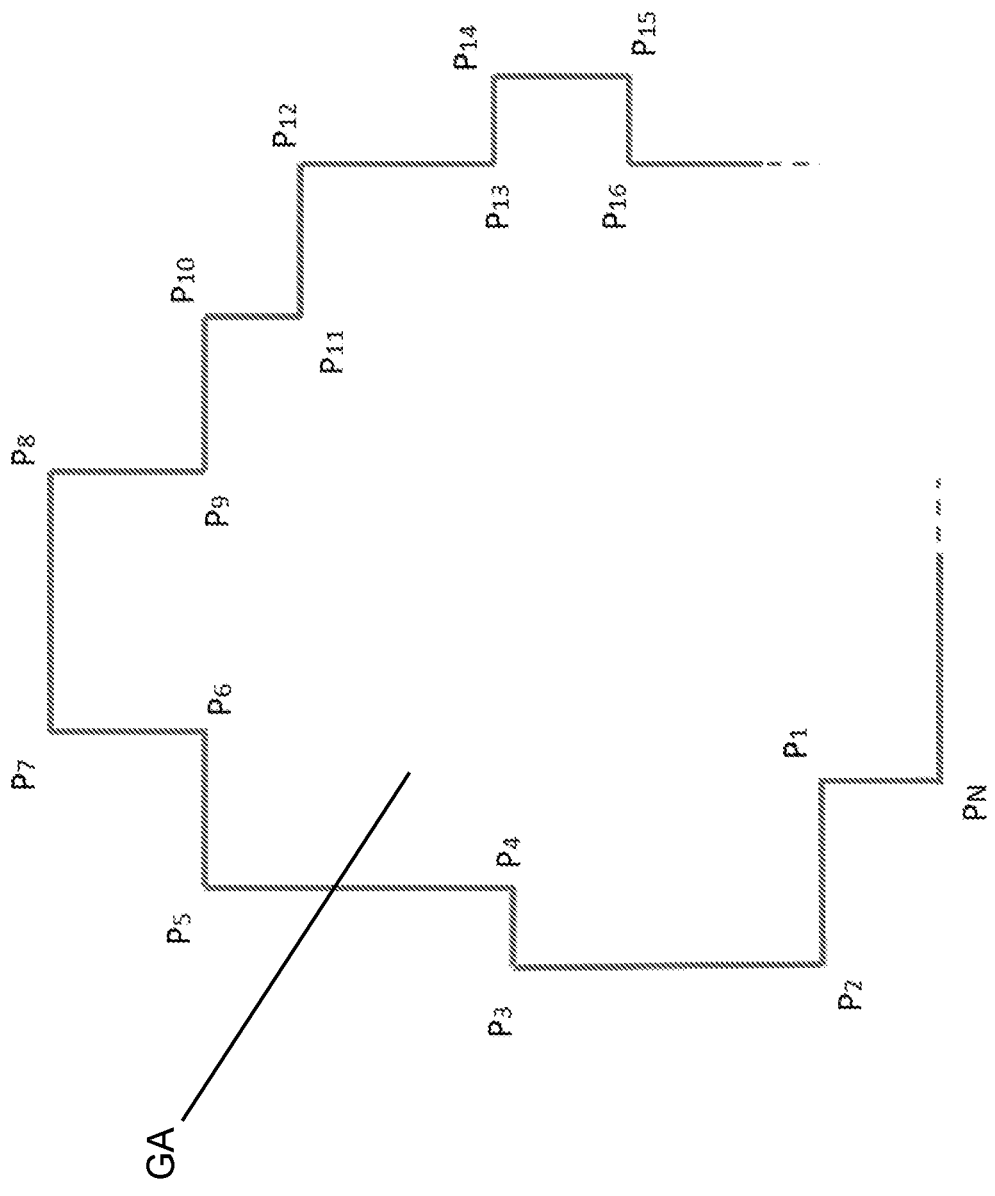
FIGS. 1-2 schematically show a graphic representation of data used in embodiments of the present invention.

With reference to the accompanying figures, reference numeral 100 identifies a Radio Access Network, RAN, through which the present invention can be implemented.

Figure 7:
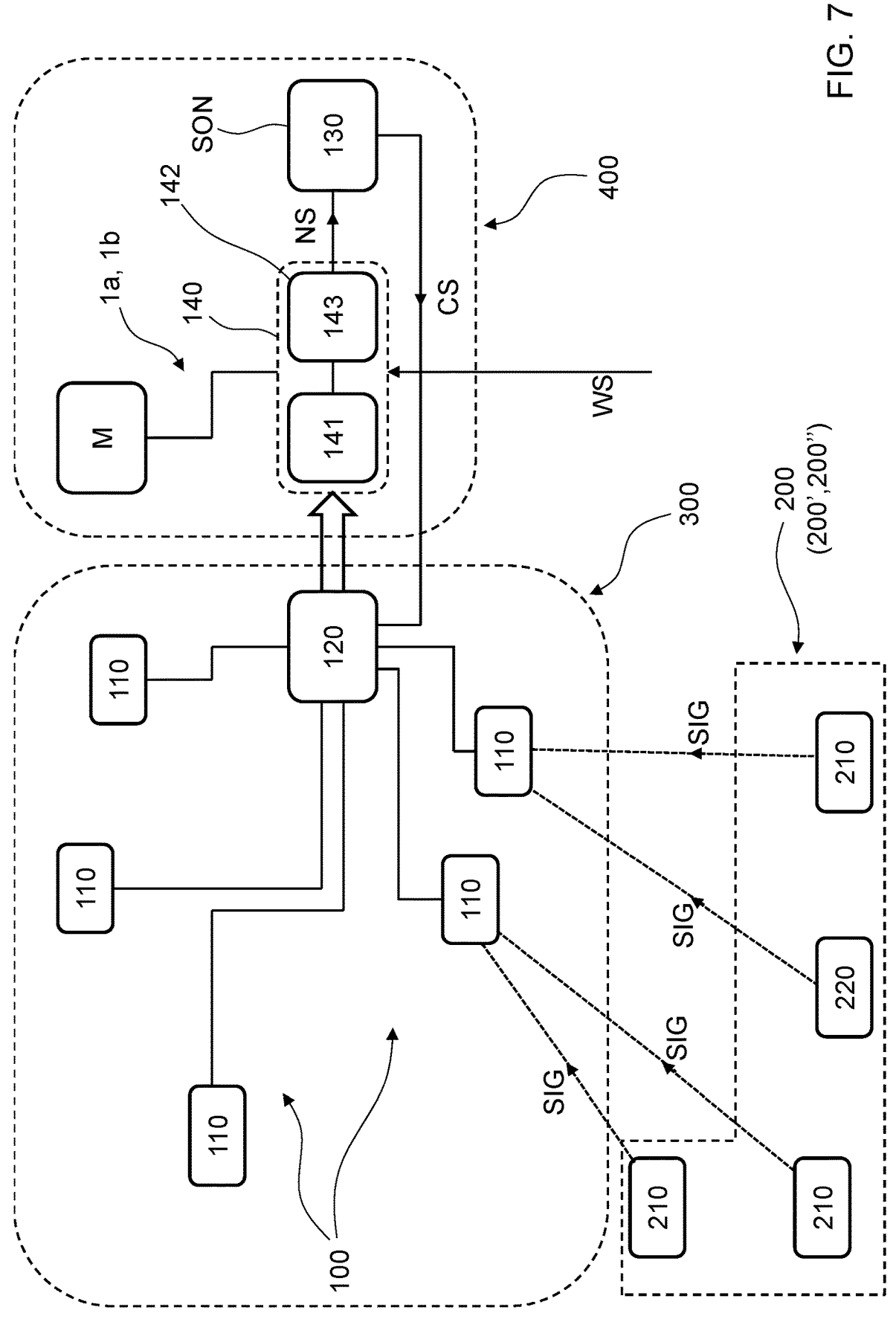
FIG. 7 schematically shows a block diagram of a system according to embodiments of the present invention.

RAN 100 comprises a plurality of Radio Base Stations, RBS, 110 spread over a territory so as to provide radio coverage (FIG. 7).

For example, RAN 100 can provide radio access based on 4G or 5G technologies. The person skilled in the art will understand that the present invention is not in principle limited to these technologies, but can be implemented also with different/equivalent/future radio access technologies/standards.

RBSs 110 are connected to a control structure which handles radio traffic to and from RBSs 110. The control structure, which may include both apparatuses installed at the radio base stations RBSs 110 and in remote locations, is herein generally referred to as control unit 120. The latter is per se known and will not be disclosed in detail in the following.

For example, the control unit 120 may comprise a Radio Network Controller, RNC, associated with RAN 100 (e.g., in the case of a 3G network) or one or more elements of a Mobility Management Entity, MME (e.g., in the case of a 4G or 5G network).

RAN 100 and control unit 120 form a radio access communications system, designated at 300 in FIG. 7.

RBSs 110 exchange radio signals with wireless devices 200 via respective wireless connections.

Wireless devices 200 can comprise mobile devices 210, such as mobile phones (smartphones), tablets, laptops, etc.

Wireless devices 200 can comprise non-mobile devices 220, such as Fixed Wireless Access, FWA, devices.

Figure 3:
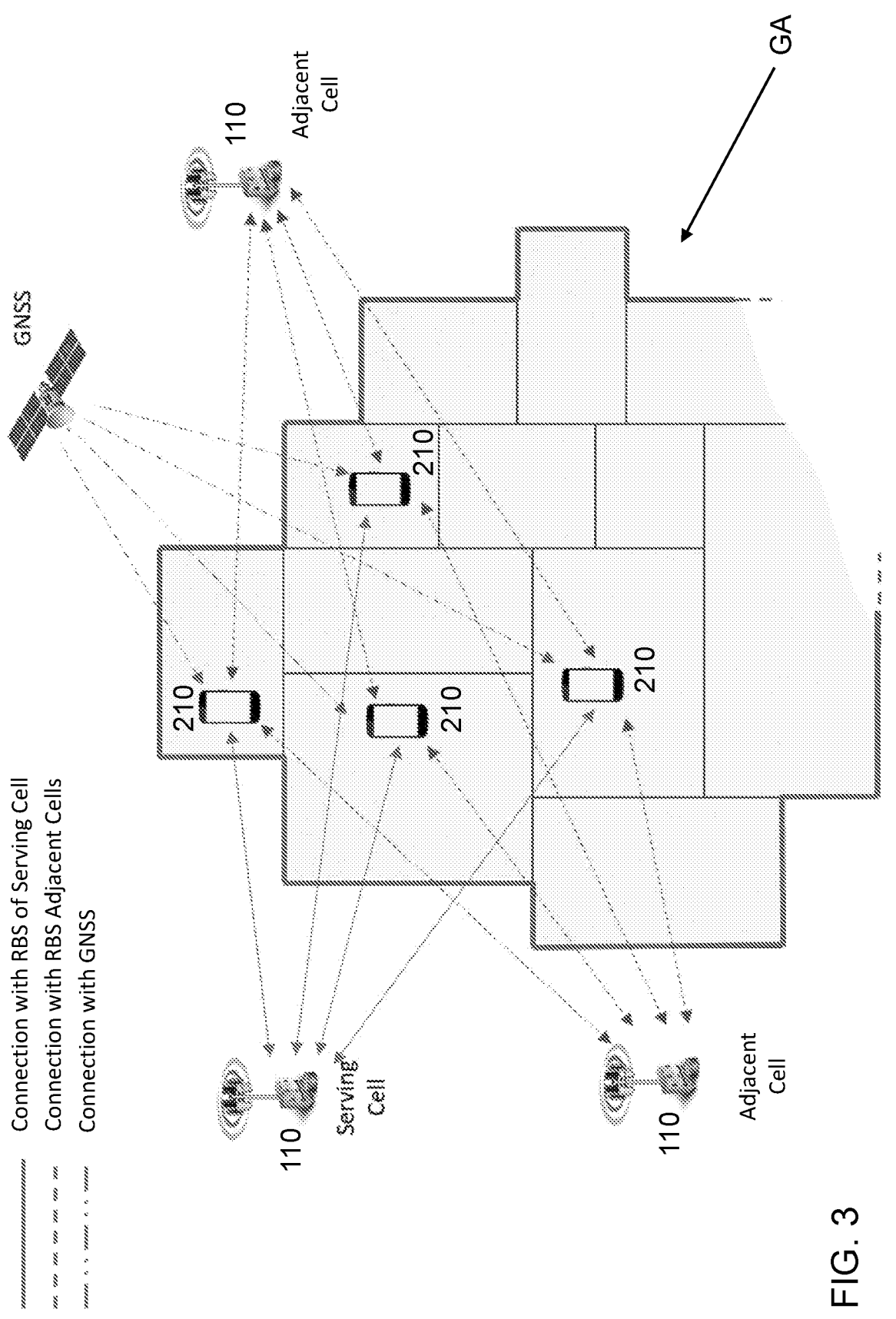
FIGS. 3-4 schematically show connections between different types of devices employed in embodiments of the present invention.

The Applicant observes that the geographical position of mobile devices 210 is a priory unknown, this being inherently due to the mobility feature of such devices. As will be better explained in the following, the current position of each mobile device 210 can be determined based on a Global Navigation Satellite System, GNSS. By way of example, FIG. 3 shows multiple mobile devices 210, each in communication with a GNSS, an RBS 110 of the serving cell and a couple of RBSs 110 of adjacent cells.

Figure 4:
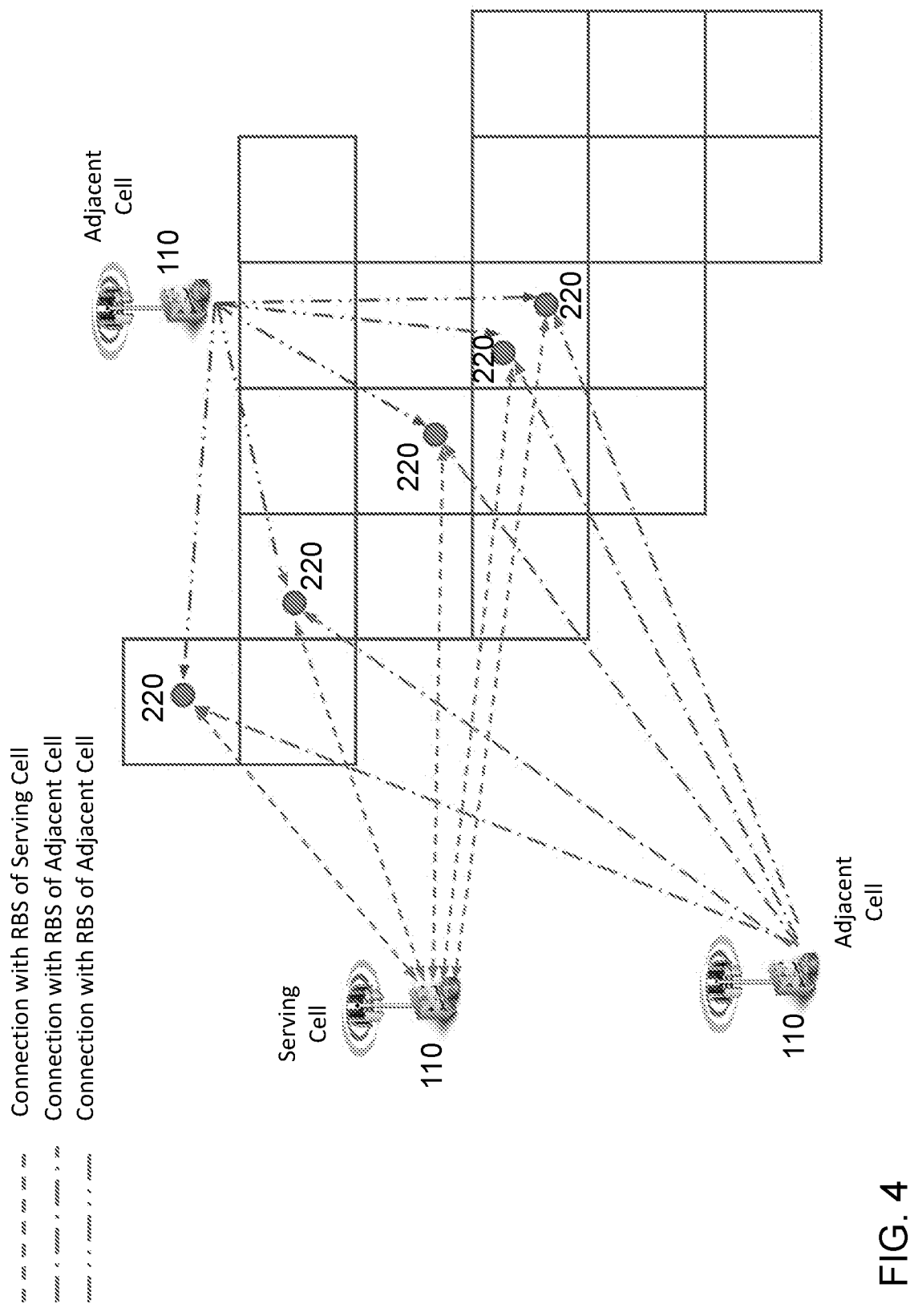

The Applicant observes that the geographical position of non-mobile devices 220 is a priori known, and stored in a memory area of the telecommunications operator/provider. The geographical position of a non-mobile device 220 can thus be determined based on an identifier, uniquely associated to the device, and the pre-stored position maintained in the memory of the operator/provider. By way of example, FIG. 4 shows a plurality of wireless, non-mobile devices 220, each in communication with an RBS 110 of the serving cell, and a couple of RBSs 110 of adjacent cells.

According to the invention, a geographical area of interest GA is determined.

The area of interest GA can be of any desired dimension (e.g. ranging from a part of a town to a region or a nation).

The area of interest GA can be of any desired shape.

Figure 2:
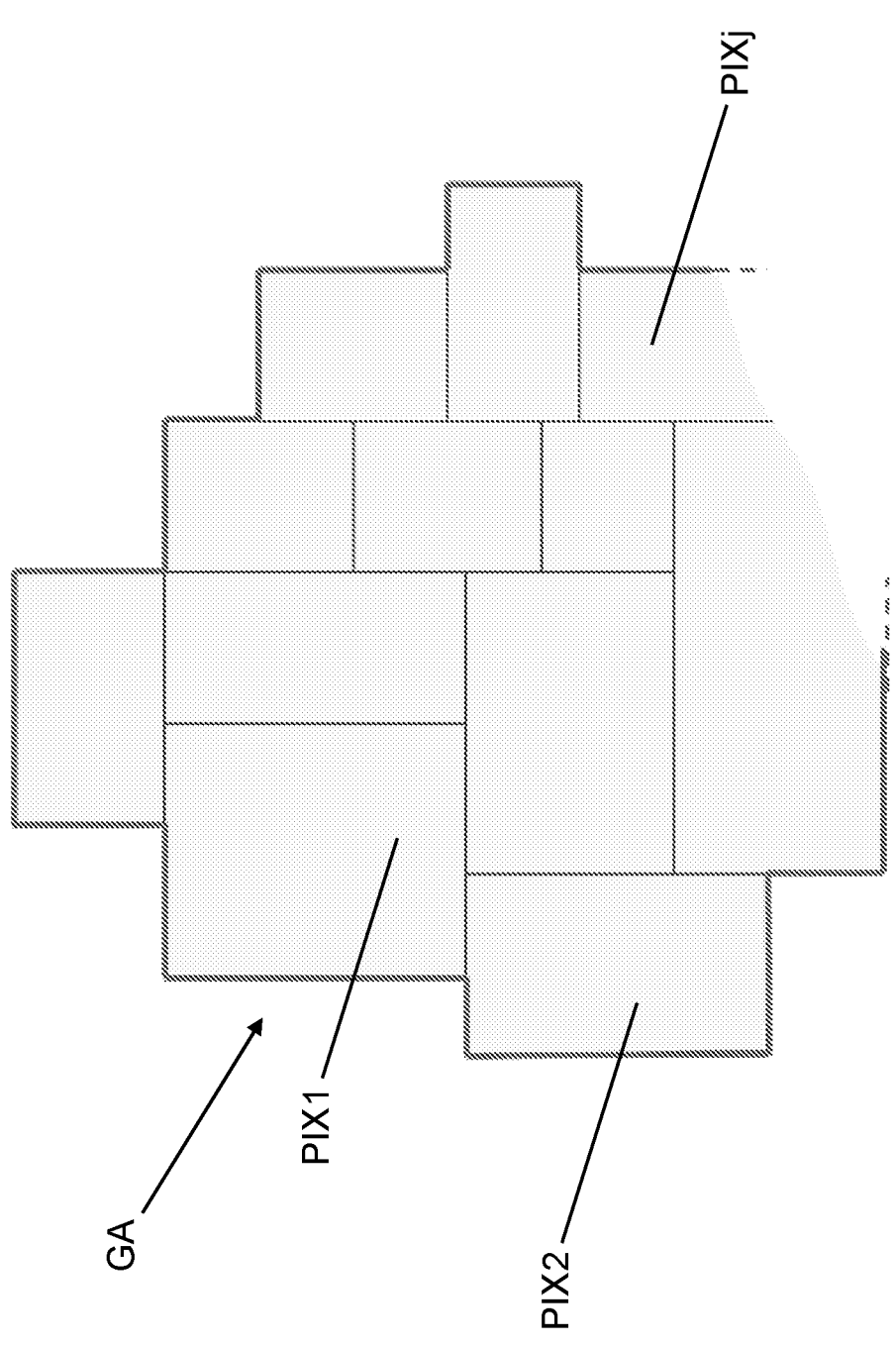

FIGS. 1-3 show an example of how the area of interest can be delimited, i.e. by means of orthogonal (horizontal and vertical) segments; each segment is identified by its end points $P_i$-$P_{i+1}$. Given that the perimeter of the area of interest GA is formed by N segments, the segment that closes the perimeter joins point $P_N$ with point $P_1$.

Preferably, the presence of wireless devices 200 (mobile devices 210 and/or non-mobile devices 220) located in the area of interest GA is detected.

This operation can be performed in a manned per se known, based on the wireless signalling between the network and the devices.

The Applicant observes that, in the context of the present invention, identity of the users associated with wireless devices 200 is not used, as the data leveraged by the invention are substantially position of the devices, measurements correlated to the wireless connection between the wireless devices and the RAN 100, and time references associated with the measurements. Accordingly, no privacy issues arise from the implementation of the present invention.

In a preferred embodiment, the area of interest GA is divided into a plurality of subareas; each subarea is referred to as "pixel".

Merely by way of example, the pixels can have a rectangular shape. Back to the example of FIGS. 1-3, the pixels can have sides which are parallel/orthogonal to the segments defining the area of interest GA. FIG. 2 schematically shows an exemplary division into pixels PIX1, PIX2 . . . PIXj of the area of interest GA.

Preferably, the pixels entirely cover the area of interest GA, in particular with no overlapping between each pixel and the neighboring ones.

In other terms, each pixel can be defined as a geographical zone having dimensions smaller than the area of interest GA and entirely included in the same area of interest GA. The assembly of all the pixels forms the area of interest GA.

According to a preferred embodiment of the invention, the pixels are defined based on the distribution of the wireless devices over the area of interest GA.

In greater detail, the dimensions (and thus the perimeter) of each pixel can be defined, over time, based on the density of wireless devices in the area of interest GA—i.e. the number of wireless devices per unit of area. The dimensions of each pixel are determined in such a way that the number of wireless devices in each pixel is substantially the same. Accordingly, pixels with a lower density of wireless devices will have a larger area, and pixels with a higher density of wireless devices will have a smaller area.

Since the wireless devices 200 can include mobile devices 210, the distribution of wireless devices in the area of interest GA can change over time and, consequently, also the pixel dimensions can vary over time.

This feature allows each pixel to provide significant information in the context of the present invention. In fact, it is substantially prevented that one or more pixels include a number of wireless devices that is too small to be significant for determination of weather conditions.

FIGS. 2-3 schematically show pixels having different dimensions, according to the preferred feature discloses hereabove.

According to the invention, the geographical position of each wireless device 200 is determined. In particular, the position of each wireless device 200 is determined based on information signal(s) SIG sent from each wireless device 200 and received by the RAN 100.

Preferably, the information signals SIG are sent according to the Minimization of Drive Tests, MDT, technology.

The MDT technology is standardized by ETSI and disclosed in technical specification 3GPP TS 37.320; for example, version 15.0.0 (2018-06) can be taken into consideration. Said technical specification is herein incorporated by reference.

In an embodiment, transmission of the information signals SIG by the wireless devices 200 is obtained by activation, by the network, of the of the MDT features of said wireless devices. As a consequence, wireless devices 200 supporting the MDT technology will provide MDT signals—i.e. the information signals SIG.

Wireless devices which do not include their position in the information signal SIG, will provide anyway radio quality measurements (i.e. first/second measurement parameters) via the information signals SIG. The position of such devices can be anyway determined with a reasonable degree of precision based on per se known techniques, such as for example the Cell Trace technology. In addition or as an alternative, if such device (not providing its position in the information signal SIG) is an FWA 220, its position can be retrieved from a dedicated database—as disclosed below.

In an example, the information signal SIG comprises data representative of the geographical position of the wireless device. For example, the position (expressed in terms of latitude and longitude) is determined by the wireless device based on a cooperation with a GNSS (e.g. GPS) and communicated to the network via the information signals(s) SIG. This applies, for example, to mobile wireless devices 210, the position of which typically changes over time.

In an example, the information signal SIG comprises an identifier, uniquely associated with the wireless device. The geographical position of such device can be retrieved, from a pre-arranged memory area, wherein each identifier is associated to a respective geographical position. This can be applied to non-mobile wireless devices 220, the position of which typically does not change over time.

The position of each wireless device 200 (be it a mobile device 210 or a non-mobile device 220) is preferably used for defining, as explained above, the division of the area of interest GA into a plurality of pixels.

The position of each wireless device 200 is also used for generating reference data associated to weather conditions and/or for determining weather conditions in the area of interest GA.

Preferably, the method according to the invention comprises a step of receiving, from the wireless devices 200, measurement parameters; the measurement parameters are representative of measurements of radio quality of the wireless connection between each wireless device 200 and the RAN 100.

Each measurement parameter is also associated with a respective time reference, which identifies the time at which the measurement has been carried out.

Measurements are carried out over time; accordingly, measurements are available over time and, as explained in the following, allow to determine weather conditions over time.

Preferably, measurement parameters are included in the aforementioned information signals SIG; the latter, as said, can be MDT signals.

For example, measurement parameters can include one or more of the following:

Received Signal Received Quality, RSRQ;
Received Signal Received Power, RSRP;
Channel-Quality Indicator, CQI;
Timing Advance, TA.

The time reference associated to a measurement parameter—or a set of measurement parameters regarding measurements made substantially at the same time—can be referred to as timestamp.

According to the invention, reference data are generated, associated to different weather conditions.

As will be further explained in the following, reference data are then used for determining weather conditions in the area of interest GA.

Advantageously, the measurement parameters provided by wireless devices 200 can be used to both calculate the reference data and determine the weather conditions in the area of interest GA (in particular, in each of the pixels in which the area of interest GA is divided).

For the sake of clarity, the measurement parameters used for determining the reference data are referred to as "first measurement parameters", and the measurement parameters used for determining the weather conditions are referred to as "second measurement parameters".

In FIG. 7, information signals SIG represent signals which carry either first measurement parameters or second measurement parameters.

The first measurement parameters are associated with respective first time references.

The second measurement parameters are associated with respective second time references.

Each first/second measurement parameter is also associated with a respective first/second time reference, which identifies the time at which the measurement has been carried out.

The first measurement parameters are transmitted by first wireless devices 200'.

The second measurement parameters are transmitted by second wireless devices 200".

Thus the wireless devices 200 mentioned above can include first wireless devices 200' and second wireless devices 200".

The first wireless devices 200' can include both mobile devices and non-mobile devices.

The second wireless devices 200" can include both mobile devices and non-mobile devices.

From a practical point of view, all the first wireless devices 200' can be other than the second wireless devices 200", or part of the first wireless devices 200' can coincide with some or all the second wireless devices 200", or all the first wireless devices 200' can be included in or coincide with the second wireless devices 200". The relationship between the first and second wireless devices 200', 200" can change over time.

In the invention perspective, whether the first and second wireless devices 200', 200" are the same, partly the same or completely different, is preferably irrelevant: what the invention is based on is a generic plurality of wireless devices providing the first measurement parameters (i.e. the measurement parameters for defining the reference data) and a generic plurality of wireless devices providing the second measurement parameters (i.e. the measurement parameters for determining the weather conditions), irrespective of the fact that the two generic pluralities of wireless devices are the same, or are partly or totally different.

Figures 8A, 8B:
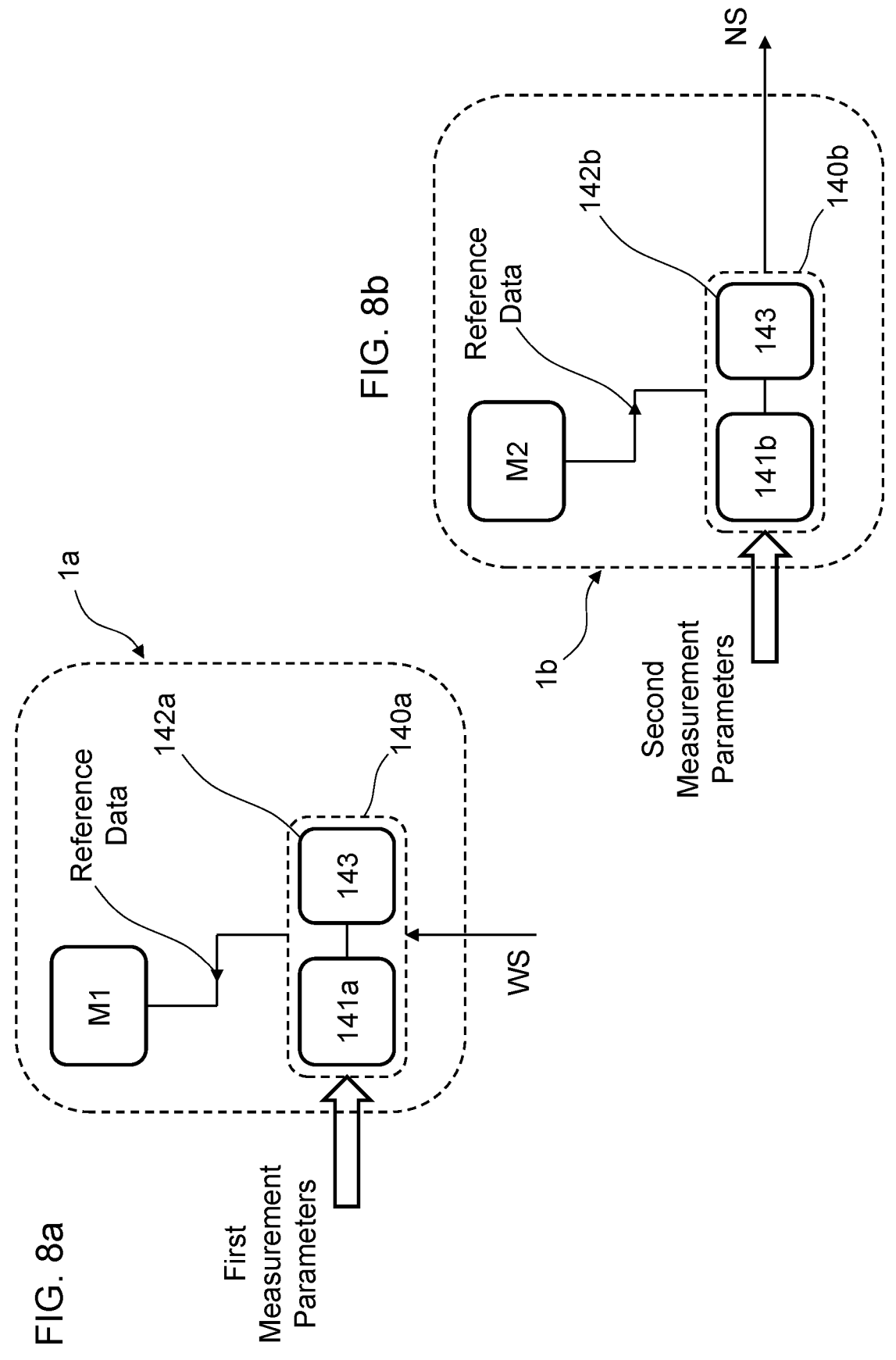
FIGS. 8a-8b show block diagrams of a possible implementation of a subpart of the system of FIG. 7.

According to the invention, a system 1a for generating reference data associated to weather conditions is provided (FIG. 8a).

System 1a comprises a first processing unit 140a.

The first processing unit 140a is configured for receiving the first measurement parameters from the first wireless devices 200'.

Preferably, the first processing unit 140a includes a first data collection unit 141a and a first processing module 142a; the first data collection unit 141a is configured for receiving the first measurement parameters and provide the same to the first processing module 142a.

The first data collection unit 141a is also configured to collect the position of each wireless device, in particular when such position is included in the information signals SIG, and provide it to the first processing module 142a.

The first processing unit 140a, and in particular the first processing module 142a, is configured for defining the area of interest GA, and preferably for dividing the area of interest GA in pixels, as disclosed above.

The first processing unit 140a, and in particular the first processing module 142a, is coupled to a first memory M1, included in said system 1a.

Data representative of the area of interest GA, and in particular of the division of the same into pixels, are preferably stored in the first memory M1.

The first processing unit 140a, and in particular the first processing module 142a, is configured for calculating the reference data based on the first measurement parameters.

In greater detail, an analysis is performed on the first measurement parameters, for example a statistical analysis.

For example, the statistical analysis may comprise determining a statistical distribution of the first measurement parameters, each of which may constitute a statistical sample.

In addition or as an alternative, values such as mean, variance, other statistical moments can be calculated based on said first measurement parameters.

Accordingly, a sort of pattern or "electromagnetic signature" is obtained for each first time reference (or set of time references). In a nutshell, for each analyzed situation (identified by the respective first time reference or set of time references) corresponding statistic parameters are calculated and the respective "signature" is defined. Characteristic patterns, i.e. specific combinations of characteristic parameters (e.g. statistical parameters) are calculated, so as to define the above mentioned "signature". In particular, variation over time of said characteristic parameters can be considered. Preferably, variation over time of the characteristic parameters in each pixel is analyzed. This will allow to recognize, in the future, similar situations from an electromagnetic standpoint, and such situations will be associated with the correct weather conditions.

In addition to the first measurement parameters, the first processing unit 140a (and in particular the first processing module 142a) receives weather signals WS, each representative of objective weather conditions in the area of interest GA at a time corresponding to said first time reference of said set of first time references. In an embodiment, weather signals WS can be received for each of the pixels in which the area of interest is divided.

The objective weather conditions can be determined by suitable sensors and/or other sources of information.

In view of the above, the first processing unit 140a (and in particular the first processing module 142a) is configured to associate the results of the analysis (obtained based on the first measurement parameters) with the objective weather conditions (included in the weather signals WS). The link between the results of the analysis and the objective weather conditions is generated based on the respective time references: put simply, the values obtained based on first measurement parameters detected at a certain time (identified by the respective first time reference or set of first time references) will be associated with weather conditions occurring at that certain time. The link between the results of the analysis and the objective weather conditions is also based on the position of the wireless devices which provided the first measurement parameters, and the position in which the objective weather conditions have been detected.

The reference data thus calculated are preferably stored in the first memory M1. As said, the area of interest GA is preferably divided into pixels PIX1, PIX2, . . . , PIXj. A subset of reference data is preferably generated for each of said pixels PIX1, PIX2, . . . , PIXj.

Once the reference data have been defined, a priori unknown weather conditions can be determined.

In this connection, according to the invention a system 1b for determining weather conditions is provided (FIG. 8b).

System 1b comprises a second processing unit 140b.

The second processing unit 140b is configured for receiving the second measurement parameters from the second wireless devices 200".

Preferably, the second processing unit 140b includes a second data collection unit 141b and a second processing module 142b; the second data collection unit 141b is configured for receiving the second measurement parameters and provide the same to the second processing module 142b.

The second data collection unit 141b is also configured to collect the position of each wireless device, in particular when such position is included in the information signals SIG, and provide it to the second processing module 142b.

The second processing unit 140b, and in particular the second processing module 142b, is configured for determining weather conditions based on the second measurement parameters.

System 1b comprises a second memory M2. The second memory is coupled to the second processing unit 140b, and in particular to the second processing module 142b.

Preferably, the aforementioned reference data are stored in the second memory M2.

Preferably, the data representative of the area of interest GA and in particular of the division into pixels of the same are stored in the second memory M2.

In an embodiment, the reference data (and preferably the data representative of the area of interest and the division into pixels) are transferred from the first memory M1 to the second memory M2.

In an embodiment, the first and second memory M1, M2 are the same memory.

The second processing unit 140b (in particular the second processing module 142b) is configured to determine weather conditions also based on said reference data.

The second processing unit 140b (in particular the second processing module 142b) compares the second measurement parameters with the reference data and, as a result, weather conditions of the area of interest GA are determined.

As said, the second measurement parameters are associated with respective second time references or sets of second time references; thus the weather conditions are equally associated to said time references, i.e. are determined for defined time periods, depending on the time references associated to the second measurement parameters.

As said, the area of interest GA is preferably divided into a plurality of pixels; based on the geographical position of each wireless device (be it directly included in the information signals SIG or retrieved based on pre-stored data), the weather conditions are determined for each pixel.

In summary, the weather conditions are determined over time, for each of the pixels in which the area of interest GA is divided.

The weather conditions thus determined are included in a notification signal NS.

In an embodiment, the notification signal NS can be sent to one or more devices/apparatuses to which data regarding weather conditions have to be provided for information purposes.

In an embodiment, the notification signal NS can be employed for managing the RAN 100, as will be further disclosed in the following.

Weather conditions can be represented, for example, by labels—to be associated with the area of interest GA and, in particular, to each pixel. For example, two labels such as "dry", "wet" can be taken into consideration. In a different example, four labels such as "dry", "wet", "rain", "snow" can be taken into consideration.

As will be explained in the following, the present invention allows to associate the area of interest, and in particular each pixel, with a respective label.

In an embodiment, a processing technique based on an analytic model can be used, wherein variations of first measurement parameters are beforehand correlated (through an analysis, for example a statistical analysis, as disclosed above) to variations of the weather conditions (carried by the weather signals WS), for example defining—in simple implementations—a set of thresholds. The second measurement parameters are thus processed and compared with the reference data; as a result, the weather conditions are determined. Variations of the measurements parameters can include, for example, one or more of: variations of average values, variations of variance, variation of the spectrum of Gaussian Mixture Modeling (GMM) components of the measurement probability distribution, etc.

In an embodiment, an Artificial Intelligence, AI, system 143 is provided.

The AI system 143 can be used for generating the reference data and preferably for determining the weather conditions in the area of interest GA. Accordingly, the AI system 143 is represented as included both in the first processing module 142a (FIG. 8a) and in the second processing module 142b (FIG. 8b).

The AI system 143 is trained to associate different radio quality measurements to different weather conditions. After a training period of the AI system 143 (which employs first measurement parameters), the second measurement parameters sent from the wireless devices 200" are provided as input to the AI system 143 and the latter determines the weather conditions of the area of interest GA based on said second measurement parameters.

Preferably, training the AI system 143 comprises defining two or more labels, each associated to respective different weather conditions. As said, for example, labels such as "rain", "snow", "dry", "wet" can be used, each corresponding to the indicated weather conditions. The AI system 143 is provided, as input, with training datasets and training labels. The training datasets comprise first measurement parameters associated with respective geographical positions and first time references; as said, the first measurement parameters can be included in MDT signals. The training labels are associated with the geographical positions and time references associated with the first measurement parameters. The training labels indicate the objective weather conditions of the geographical position associated with the first measurement parameters, at the time at which the measurement is carried out—i.e. the time reference associated with the first measurement parameters. The training labels can be provided to the AI system 143, for example, by one or more sensors deployed in the area of interest GA. From a practical point of view, the training labels represent the objective weather conditions included in the weather signals WS; the first measurement parameters are correlated to the environment in which the wireless signals exchanged between the first wireless devices 200' and the RAN 100 propagate, such environment being influenced by the weather conditions; by teaching to the AI system 143, over time, which weather conditions correspond to which set(s) of measurement parameters, the same AI system 143 becomes capable of discriminating different weather conditions based on radio measurement parameters. Training of the AI system 143 provides, as a result, the determination of the reference data. In case the AI system 143 is employed, the reference parameters preferably form a set of parameters internal to the AI system 143 itself (e.g. weights associated to synapsis, etc.) which, as disclosed above, are then used in the operative phase, when a priori unknown weather conditions have to be determined. In this scenario, the memory in which the reference data are stored (that is labelled as M, M1, M2 in FIGS. 7, 8a-8b) is preferably an internal memory of the AI system 143. It has to be noted that memories M, M1, M2 are shown separately from the AI system 143 only for the sake of clarity, but—as said—can be included in the AI system 143 itself. In the operative phase, the comparison between the second measurement parameters and the reference data is performed by providing the second measurement parameters to the trained AI system (i.e. the AI system operating based on the aforementioned reference data), thereby applying to the second measurement parameters the reference data defined in the training phase.

The Applicant observes that, in a preferred embodiment, the training phase and the operative phase are not strictly separated: the training phase can continue also after the operative phase has begun—to the extent that weather signals WS are available—so as to further improve accuracy and reliability of the methodology.

Figure 5:
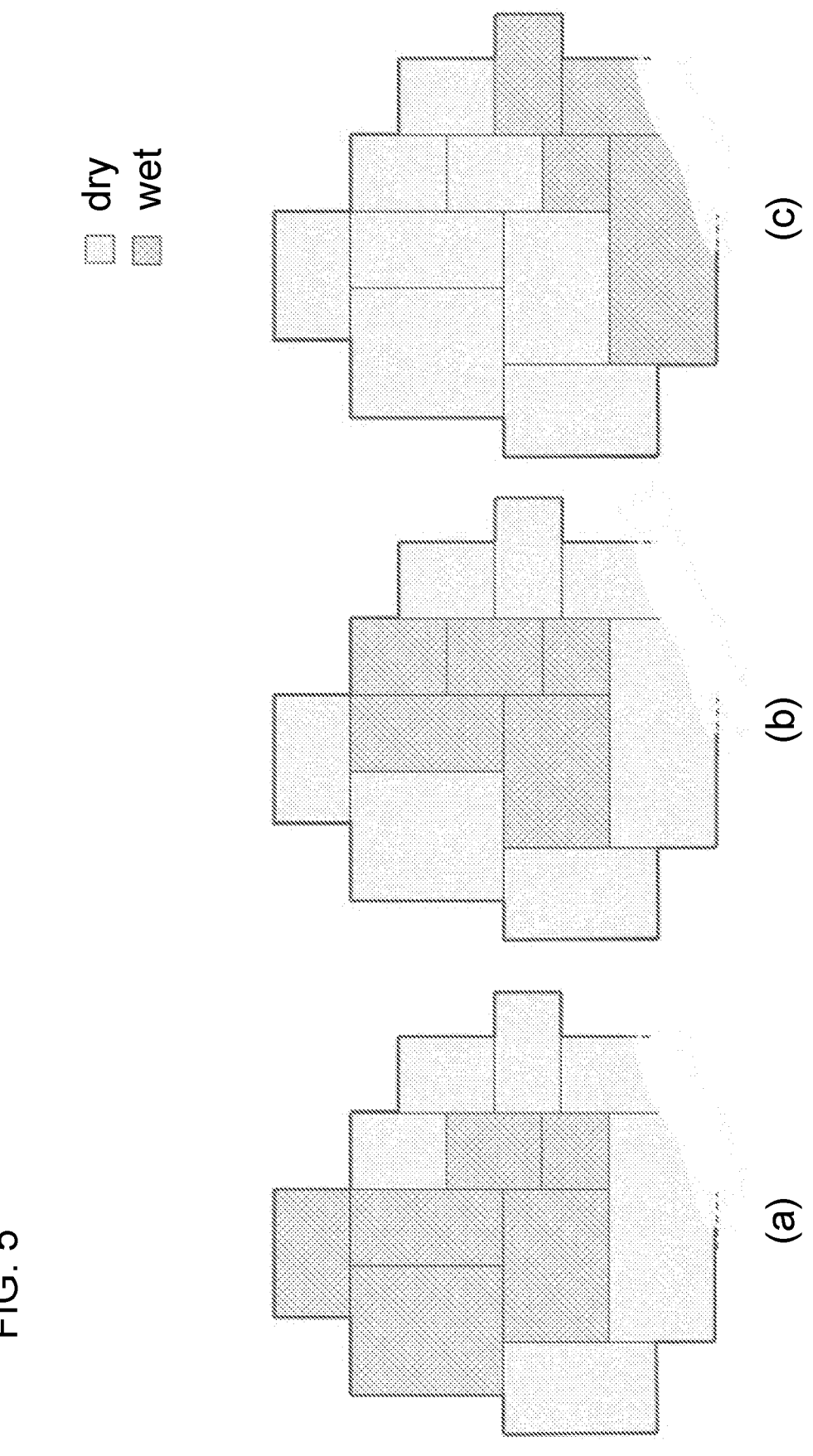
FIGS. 5(a)-5(c) schematically show outcomes obtained by embodiments of the present invention.

FIGS. 5(a) to 5(c) schematically represent the outcome of a weather condition assessment performed by the present invention (either with an analytic system or an AI system). Two labels are used, namely "dry" and "wet". FIG. 5(a) represents weather conditions at a first time, wherein certain pixels are labelled as "wet" and other pixels are labelled as "dry"; FIGS. 5(b) and 5(c) represent weather conditions at subsequent times, wherein—as shown—the labelling of certain pixels has changed over time.

In a preferred embodiment, spatial correlation between neighboring pixel can be leveraged in order to obtain more precise and consistent results. In other terms, labelling of a certain pixel as "wet" or "dry", for example, can be carried out not only based on the information signals SIG provided by the wireless devices 200 located in such pixel, but also on information signals SIG of wireless devices 200 located in one or more surrounding pixels and/or on the label(s) applied to one or more surrounding pixels. The surrounding pixels can include, for example, neighboring pixels. The spatial extent over which surrounding pixels shall be considered can be decided and suitably set up depending on specific needs/implementations.

In a preferred embodiment, time correlation between different data detected in connection with a certain pixel, over time, can be leveraged in order to obtain more precise and consistent results. In other terms, labelling of a certain pixel as "wet" or "dry", for example, can be carried out not only based on the information signals SIG provided by the wireless devices 200 located in such pixel at a given time, but also on previous detections obtained in connection with the same pixel. The time extent over which previous detections (i.e. information signals SIG) shall be considered can be decided and suitably set up depending on specific needs/implementations.

Advantageously, transmission of the information signals SIG is repeated in time by the wireless devices 200. Accordingly, weather conditions can be dynamically determined and evaluated over time—as shown, by way of example, in FIG. 5.

In one embodiment of the present invention, the information regarding weather condition is used also for controlling and possibly modifying the operation of RAN 100. In fact, the Applicant observes that weather conditions can impact on quality of radio coverage. Accordingly, when weather conditions which negatively affect radio coverage occur, it is possible to apply modifications (e.g. in terms of radiation patterns) to the RAN 100 in order to make up for said negative conditions.

In one embodiment, a Self-Organizing Network, SON, is associated to the RAN 100; thus, the modifications can be automatically determined and carried out. The notification signal NS generated by the second processing unit 140b (and in particular by the second processing module 142b) is received by a managing unit 130 (which is part of or forms the SON); the latter is configured to determine modifications to be applied to the RAN 100 based on the notification signal NS, and to send command signals CS to the control unit 120 for causing such modifications to be applied.

The system 1*b* for determining weather conditions and the managing unit 130 form a system, denoted at 400 in FIG. 7, for controlling the RAN 100.

It has to be noted that FIG. 7 represents a preferred embodiment, wherein one processing unit 140 performs the operations of both the first and second processing units 140*a*, 140*b*; in greater detail, the processing unit 140 comprises a data collection unit 141 (which collects both the first and second measurement parameters, and the positions of the wireless devices) and a processing module 142 (which performs the operations carried out by both the first and second processing module 142*a*, 142*b*; in particular, the processing module 142 can be implemented as the aforementioned AI system 143). A memory M is represented, which stores the data stored in the first and second memories M1, M2. Accordingly, the processing unit 140 and the memory M form both a system 1*a* for generating reference data associated to weather conditions and a system 1*b* for determining weather conditions.

Figure 6:
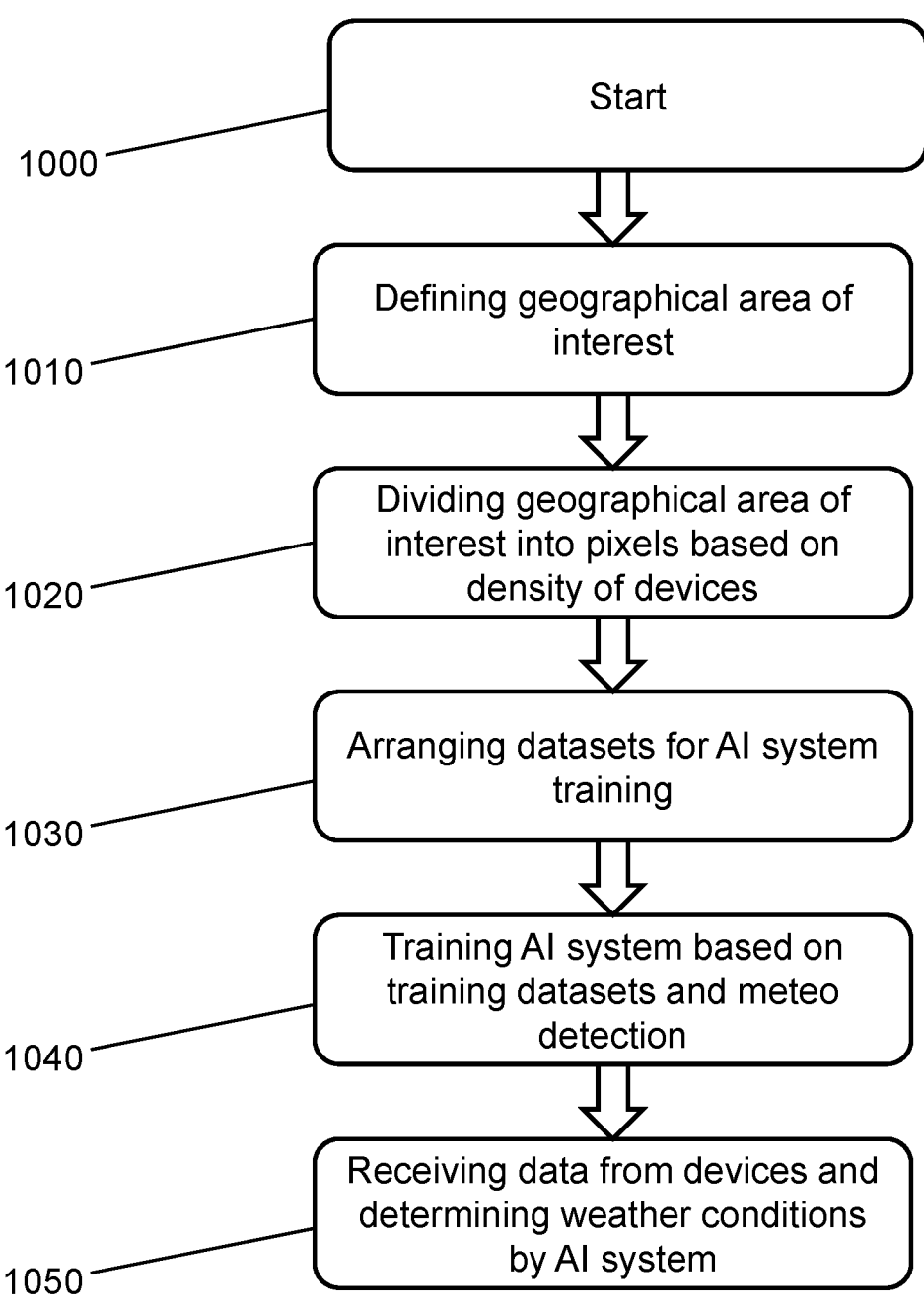
FIG. 6 is a flowchart schematically representing operations carried out in embodiments of the present invention.

FIG. 6 shows a flow chart which illustrates a preferred embodiment of the present invention.

At step 1000, the method is started.

At step 1010, the geographical area of interest GA is determined.

At step 1020, the area of interest GA is divided into multiple pixels. As said, the area/dimensions of the pixels are calculated based on the density of wireless devices located in the area of interest GA.

At step 1030, datasets for training the AI system 143 are arranged. As explained above, the datasets used for training the AI system include first measurement parameters from the first wireless devices 200', information regarding the division into pixels of the area of interest GA and labels applied to each pixel, over time.

At step 1040, training of the AI system 143 is executed.

At step 1050, the AI system 143 is fully operative and, based on second measurement parameters provided by wireless devices, determines weather conditions for each pixel.

The invention claimed is:

1. A method for generating reference data associated to weather conditions, comprising:
  determining a geographical area of interest;
  receiving, from first wireless devices wirelessly connected to a Radio Access Network (RAN) first measurement parameters representative of measurements of radio quality of the wireless connection between said first wireless devices and the RAN, wherein said first wireless devices are located in said area of interest, said first measurement parameters being associated with respective first time references;
  for each first time reference or set of first time references, determining reference data, associated to said first time reference or set of first time references, by performing an analysis of said first measurement parameters;
  receiving a weather signal separately from the first measurement parameters, the weather signal representative of objective weather conditions in said area of interest at a time corresponding to said first time reference of said set of first time references;
  storing said reference data in association with the respective objective weather conditions associated to the same time reference or set of time references.

2. The method according to claim 1 wherein said first measurement parameters are included in Minimization of Drive Tests (MDT) signals transmitted by said first wireless devices.

3. The method according to claim 1, wherein determining said reference data comprises:
  providing an Artificial Intelligence (AI) system;
  training said AI system to associate different radio quality measurements to different weather conditions.

4. The method according to claim 3, wherein training said AI system comprises:
  defining two or more labels, each associated to a respective different weather condition;
  providing in input to said AI system:
    training datasets, comprising said first measurement parameters associated with respective geographical positions and time references;
    training labels associated with said geographical positions and time references.

5. A method for determining weather conditions, comprising:
  performing the method of claim 1;
  receiving, from a plurality of second wireless devices wirelessly connected to said RAN, second measurement parameters representative of measurements of radio quality of the wireless connection between said second wireless devices and the RAN, wherein said second wireless devices are located in said area of interest, said second measurement parameters being associated with respective second time references;
  comparing the second measurement parameters with the reference data;
  determining weather conditions, associated with said second time references, of said area of interest, based on said comparison.

6. The method according to claim 5, comprising dividing said area of interest into a plurality of pixels, based on the distribution of said wireless devices in the area of interest,
  wherein determining said reference data comprises determining a subset of reference data for each of said pixels;
  wherein determining weather conditions of said area of interest comprises determining weather conditions of each of said pixels.

7. The method according to claim 5 comprising defining two or more labels, each representative of respective weather conditions,
  wherein associating said reference data with the respective objective weather conditions comprises:
    selecting at least one label as a function of said respective objective weather conditions;
    associating said reference data with the selected label;
    wherein determining weather conditions of said area of interest comprises:
    selecting at least one label based on the comparison between the second measurement parameters and the reference data;
    associating the selected label to the area of interest.

8. The method according to claim 6, wherein determining a subset of reference data for each pixel comprises, for each pixel:
  selecting at least one label based on the objective weather conditions of said pixel;
  associating the subset of reference data associated to said pixel with the selected label;
  wherein determining weather conditions of each pixel comprises, for each pixel:

19 selecting at least one label based on the comparison between the second measurement parameters and the reference data;

associating the selected label to the respective pixel.

9. The method according to claim 5, comprising:

receiving, from each first and/or second wireless device, an information signal, including at least said first and/or second measurement parameters;

determining a position of each of said first and/or second wireless devices, based on the respective information signal, wherein:

if said information signal also comprises data representative of a geographical position of said first and/or second wireless device, determining the position of said first and/or second wireless device comprises reading said geographical position from said information signal;

if said information signal does not comprise data representative of a geographical position of said first and/or second wireless device and comprises an identifier associated to the same first and/or second wireless device, determining the position of said first and/or second wireless device comprises retrieving, from a pre-arranged memory area, a geographical position of said first and/or second wireless device associated to said identifier.

10. The method according to claim 9, wherein said information signal is a Minimization of Drive Tests (MDT) signal.

11. The method according to claim 5, wherein determining said weather conditions comprises providing said second measurement parameters as input to the AI system and determining, by said AI system, the weather conditions to be determined based on said second measurement parameters.

12. A method for controlling a radio access network (RAN) comprising:

carrying out the method for determining weather conditions according to claim 5;

determining modifications to be applied to said RAN based on said weather conditions;

applying said modifications.

13. The method according to claim 12, wherein a Self-Organizing Network (SON) is associated to said RAN, said SON comprising a managing unit configured to automatically apply said modifications based on the weather conditions.

14. The method according to claim 12 wherein the modifications to said RAN include modifications to a radiation pattern of one or more antennas of said RAN.

15. A system for generating reference data associated to weather conditions, comprising:

a first memory;

a first processor, coupled to said first memory, and configured to:

receive, from first wireless devices wirelessly connected to a Radio Access Network (RAN) first measurement parameters representative of measurements of radio quality of the wireless connection between the first wireless devices and the RAN, wherein said first wireless devices are located in said area of interest, said first measurement parameters being associated with respective first time references;

for each first time reference or set of first time references, determine reference data, associated to said first time reference or set of first time references, by performing an analysis of said first measurement parameters;

receive a weather signal separately from the first measurement parameters, the weather signal representative of objective weather conditions in said area of interest at a time corresponding to said first time reference of said set of first time references; and store, in said first memory, said reference data in association with the respective objective weather conditions associated to the same time reference or set of time references.

16. A system for determining weather conditions, comprising:

the system for generating reference data associated to weather conditions according to claim 15;

a second memory, wherein said reference data are stored;

a second processor, coupled to said second memory and configured to:

receive, from a plurality of second wireless devices, located in said geographical area of interest and wirelessly connected with said RAN, second measurement parameters representative of radio quality of wireless connection between said second wireless devices and said RAN, said second measurement parameters being associates with respective second time references;

compare the second measurement parameters with the reference data;

determine weather conditions, associated with said second time references, of said area of interest, based on said comparison; and generate a notification signal representative of the thus determined weather conditions.

17. A system for controlling a Radio Access Network (RAN) comprising:

the system for determining weather conditions according to claim 16;

a managing unit, configured to:

receive from said second processor the notification signal;

determine modifications to be applied to said Radio Access Network (RAN) based on said notification signal;

send command signals to a control unit associated to said RAN for causing said modifications to be applied.

* * * * *